United States Patent
Inagaki

(10) Patent No.: US 6,421,773 B1
(45) Date of Patent: *Jul. 16, 2002

(54) SEQUENCE CONTROL CIRCUIT

(75) Inventor: Toru Inagaki, Tokyo (JP)

(73) Assignee: Advantest Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,148

(22) Filed: Nov. 21, 1997

(30) Foreign Application Priority Data

Nov. 27, 1996 (JP) .............................. 8-316229

(51) Int. Cl.$^7$ .............................. G06F 7/38; G06F 9/00; G06F 9/44; G06F 15/00
(52) U.S. Cl. ..................... 712/234; 712/212; 712/245; 714/718
(58) Field of Search ................... 714/718, 738, 714/42, 720, 30, 724, 726, 719; 711/111, 167; 710/16, 58; 713/401; 712/224, 216, 38, 23, 205, 218, 234, 200, 247, 245; 709/108, 227, 230; 365/201, 195

(56) References Cited

U.S. PATENT DOCUMENTS

| | | | | |
|---|---|---|---|---|
| 4,167,779 A | * | 9/1979 | Sullivan et al. | 712/212 |
| 4,396,983 A | * | 8/1983 | Segarra et al. | 709/227 |
| 5,535,163 A | * | 7/1996 | Matsui | 365/201 |
| 5,568,437 A | * | 10/1996 | Jamal | 365/201 |
| 5,615,218 A | * | 3/1997 | Tsurumi | 714/743 |
| 5,646,948 A | * | 7/1997 | Kobayashi et al. | 714/719 |
| 5,652,910 A | * | 7/1997 | Boutaud et al. | 712/218 |
| 5,831,997 A | * | 11/1998 | Kodashiro | 714/738 |
| 5,854,801 A | * | 12/1998 | Yamada et al. | 714/738 |
| 5,892,779 A | * | 4/1999 | Ohyama et al. | 714/738 |
| 6,047,122 A | * | 4/2000 | Spiller | 395/678 |

OTHER PUBLICATIONS

Lee H.C. et al (MARS–a RISC–based architecture for LISP; IEEE; pp 198–206; Oct. 23–25, 1989).*

* cited by examiner

Primary Examiner—Albert Decady
Assistant Examiner—Guy Lamarre
(74) Attorney, Agent, or Firm—Knobbe, Martens, Olson & Bear, LLP

(57) ABSTRACT

A sequence control circuit provided in such as a test pattern generator of a memory test apparatus, and made capable of designating a plurality of branches according to a plurality of branch conditions in describing a test pattern program. This sequence control circuit comprises a plurality of branch address registers for storing different branch addresses, respectively, and a logic operation circuit receiving a plurality of flags for detecting combinations of flag values. A program counter controller selects a certain branch address according to a combination of flag values detected in the logic operation circuit and arranges to load the branch address stored in the selected branch address register to a program counter.

12 Claims, 3 Drawing Sheets

SEQUENCE CONTROL CIRCUIT

BACKGROUND OF THE INVENTION

1. Field of the Invention

The present invention relates to a sequence control circuit, in particular to a sequence control circuit to be preferably used in a test pattern generator of a semiconductor memory test apparatus.

2. Description of the Prior Art

A memory test apparatus is used for testing a semiconductor memory device. The memory test apparatus gives an address, data and a control signal to a memory under test (MUT) based on a predetermined test program, that is, a pattern program, and discriminates PASS/FAIL of the MUT by judging whether or not the data then read from the MUT agree with the expectation data at a predetermined timing. When address signals, test data signals and control signals are supplied to the MUT, the expectation data is considered to mean the data to be outputted from the normal MUT corresponding to a combination of the above address signals, test data signals and control signals.

FIG. 1 is a block diagram showing a basic whole structure of a conventional memory test apparatus which has been used. The memory test apparatus 1 performs a test of MUT 2 and comprises: a timing generator 5 for generating a reference clock; a test pattern generator 6 for generating address signals, test data signals and control signals to be given to the MUT 2 by receiving the reference clock; a waveform shaper 7 for receiving the respective signals from the test pattern generator 6 and applying these signals to the MUT 2 after shaping them into waveforms required for the test; and a logic comparator 8 for receiving the data read from the MUT 2 and judging PASS/FAIL; of the expectation data.

The test pattern generator 6 produces expectation data in addition to the address signals, test data signals and control signals. The expectation data is supplied to the logic comparator 8 from the test pattern generator 6. The logic comparator 8 compares the expectation data with a data read from MUT 2, performs quality judgment of the MUT according to match/mismatch of the data and outputs the result as a PASS/FAIL signal to the test pattern generator 6. Further, when the logic comparator 8 Compares the output data of the MUT 2 with the expectation data in a specific cycle of test cycles and detects the agreement between the two, the logic comparator 8 outputs a match flag MFLG to the test pattern generator 6. Here, a series of an address, test data and a control signal to be given to the MUT 2 is called as a test pattern.

Now, the test pattern generator 6 has an address generator 11, a test data generator 12 and a control signal generator 13 which generates the address signals, the test data and the control signals to be given to the MUT 2, respectively, and further has a sequence control circuit 10 which controls the address generator 11, the test data generator 12 and the control signal generator 13.

FIG. 2 is a block diagram showing an example of an internal structure of a conventional sequence control circuit.

The sequence control circuit comprises: an instruction memory 121 for storing a test program consisting of a series of instructions for generating a test pattern; a program counter (PC) 122 for designating an address of the instruction memory 121; a stack register 123 for temporary saving of addresses; a program counter controller 124 for controlling the program counter 122 and the stack register 123; a starting address register (STA) 125 for storing an initial value of the program counter 122; a branch address register (BAR) 126 for storing an address of a branch designated by branch instructions; an index register 127; an index work register 128; and an index counter 129. The index register 127, the index work register 128 and the index counter 129 are all for controlling loop instructions.

Every one of instructions to be stored in the instruction memory 121 is composed of an operation code part, that is, an operation code part of a sequence control instruction, and an operand corresponding to each instruction code. Corresponding to these instructions, the instruction memory 121 has a pair of a sequence control instruction area for storing the operation code part and an operand storing area for storing the operand. In case of a sequence control circuit of this type, there is an operand of a type which expresses a designated branch address or loop conditions in a test program or of a type which describes a parameter for generating an address, test data and a control signal to be given to the MUT 2. Accordingly, this sequence control circuit has, in addition to the above sequence control instruction area, an address operation area, a data operation area and a control, signal generation instruction area provided in a memory area of each address of instruction memory 121. The address operation area, the data operation area and the control signal generation instruction area are provided in the operand storing area.

When the instruction memory 121 is accessed by the address outputted from the program counter 122, instructions for address generation, test data generation and control signal generation are read from the address operation area, the data operation area and the control signal generation instruction area and then supplied to the address generator 11 (FIG. 1), the test data generator 12 (FIG. 1) and the control signal generator 13 (FIG. 1), respectively. Thus, the address generator 11, the test data generator 12 and the control signal generator 13 generate an address, test data and a control signal for the MUT 2, respectively.

The program counter controller 124 receives an operation code part of sequence control instructions from the instruction memory 121, a match flag MFLG from the logic comparator 8 (FIG. 1) and an output of the index counter 129. Based on the result obtained by decoding the instruction stored in the instruction memory 121, on the match flag MFLG, and on an output from the index counter 129, the program counter controller 124 controls the program counter 122 and the stack register 123. In the concrete, the program counter controller 124 handles a content of the program counter 122, that is, the value showing an address to be read next in the instruction memory 121, through increment, decrement or hold operation, and loads the value to the program counter 122. For loading the above value to the program counter 122, the program counter controller 124 arranges corresponding to the instructions read out so that any one of (i) an operand of instructions for a present address of the instruction memory 121, (ii) a content of the starting address register 125, (iii) a content of the branch address register 126, and (iv) a content of the stack register 123 is set to the program counter 122 as the value.

An address read from the operand storing area of the instruction memory 121 is also supplied to the index register 127. The index counter 129 controls loop instructions by using this index register 127 and the index work register 128 which serves as a work register, and when the counter value coincides with a specific value, outputs the value to the program counter controller 124 thereby controlling the program counter 122.

Now in recent years, a semiconductor memory called a flash memory has been developed and manufactured. The flash memory has a merit that it is a non-volatile memory and hence it can hold memory data without particular power supply from outside and can rewrite data stored in the memory in a state as it mounted on a printed wiring substrate. Characteristics of the operation of the flash memory are summarized in the following six items.

(1) operation mode setting by command input,
(2) automatic write,
(3) automatic erase (chip erase/block erase),
(4) detection of data write completion/erase completion,
(5) block protection function,
(6) device code.

Therefore, it is possible to set automatic erasing activity to be performed by a chip unit or a block unit in the flash memory by command input. However, with the flash memory, erasable number of times for the block unit is limited within a certain value while having a probability of breaking down a device due to excess erasing. Therefore, it is necessary to detect the state which informs of write completion/erase completion. In a test pattern for performing a flash memory test, according to a detection result, which is a flag, with reference to a write completion/erase completion state, it switches the branch address of the program counter in the sequence control circuit.

As described above, when the flash memory test is performed, it is required to switch the branch address in the sequence control circuit corresponding to the state of a flag. In the conventional sequence control circuit described above, it is possible to switch the branch address by an indication of one flag. However, when the branch address is switched according to a, combination of a plurality of flag values detected from the flash memory, for example, when the branch address of the pattern program is switched according to contents of both flags, one flag showing execution or termination of automatic algorithm and the other flag showing time limit over, with the conventional sequence control circuit described above, it is impossible to describe switching of the branch address like this only with one statement in the test program.

SUMMARY OF THE INVENTION

A first object of the present invention is to provide a sequence control circuit which can designate in a program description a plurality of branches depending on plural branch conditions, thereby enabling a user to describe the program easily.

A second object of the present invention is to provide a sequence control circuit which can designate in a test pattern program description of a semiconductor memory a plurality of branches depending on plural branch conditions, thereby enabling a user to describe the pattern program easily and to reduce the test time. In the concrete, the second object of the present invention is to provide, when contents of signals outputted from a device under test is applied as a branch condition, a sequence control circuit which allows to designate a plurality of branches according to a combination of plural branch conditions.

The first object of the present invention is achieved by a sequence control circuit which has a program counter and in which circuit an address to be loaded to the program counter can be switched depending on the result of detection made for combinations of a plurality of branch conditions.

The second object of the present invention is achieved by a sequence control circuit provided in a test pattern generator of a memory test apparatus for performing a test of a semiconductor memory device, the sequence control circuit comprising an instruction memory for storing each of the instructions of the test program, a plurality of branch address registers each for storing a branch address, a logic operation circuit for receiving a plurality of flags and detecting a combination of flag values, a program counter for outputting an address to the instruction memory, a program counter controller for controlling the program counter according to a control word read from the instruction memory and selecting one of the branch address registers corresponding to a combination of the flag values, wherein the branch address stored in the branch address register selected by the program counter controller is loaded in the program counter.

In other words, in the sequence control circuit of the present invention, according to the detection result of a combination of a plurality of flags which represent branch conditions, the address to be loaded into the program counter is switched. Therefore, by employing the sequence control circuit in the pattern generator of the memory test apparatus for performing the semiconductor memory test, a complicated test pattern can easily be produced through a relatively simple modification of the circuit.

When a time-out occurs during block erasing operation in a flash memory test, the flash memory has been considered defective as it is in the test according to the conventional test pattern, however, in this case, the memory is good and usable in the blocks other than the block showing the time-out. Therefore, it is only necessary to jump to any other block to continue the test without merely discarding the useful memory as defective. According to the sequence control circuit of the present invention, it is particularly easy to generate the test pattern in these cases.

The above and other objects, features, and advantages of the present invention will become apparent from the following description based on the accompanying drawings which illustrate an example of a preferred embodiment of the present invention.

DESCRIPTION OF THE PREFERRED EMBODIMENT

Figure 1:
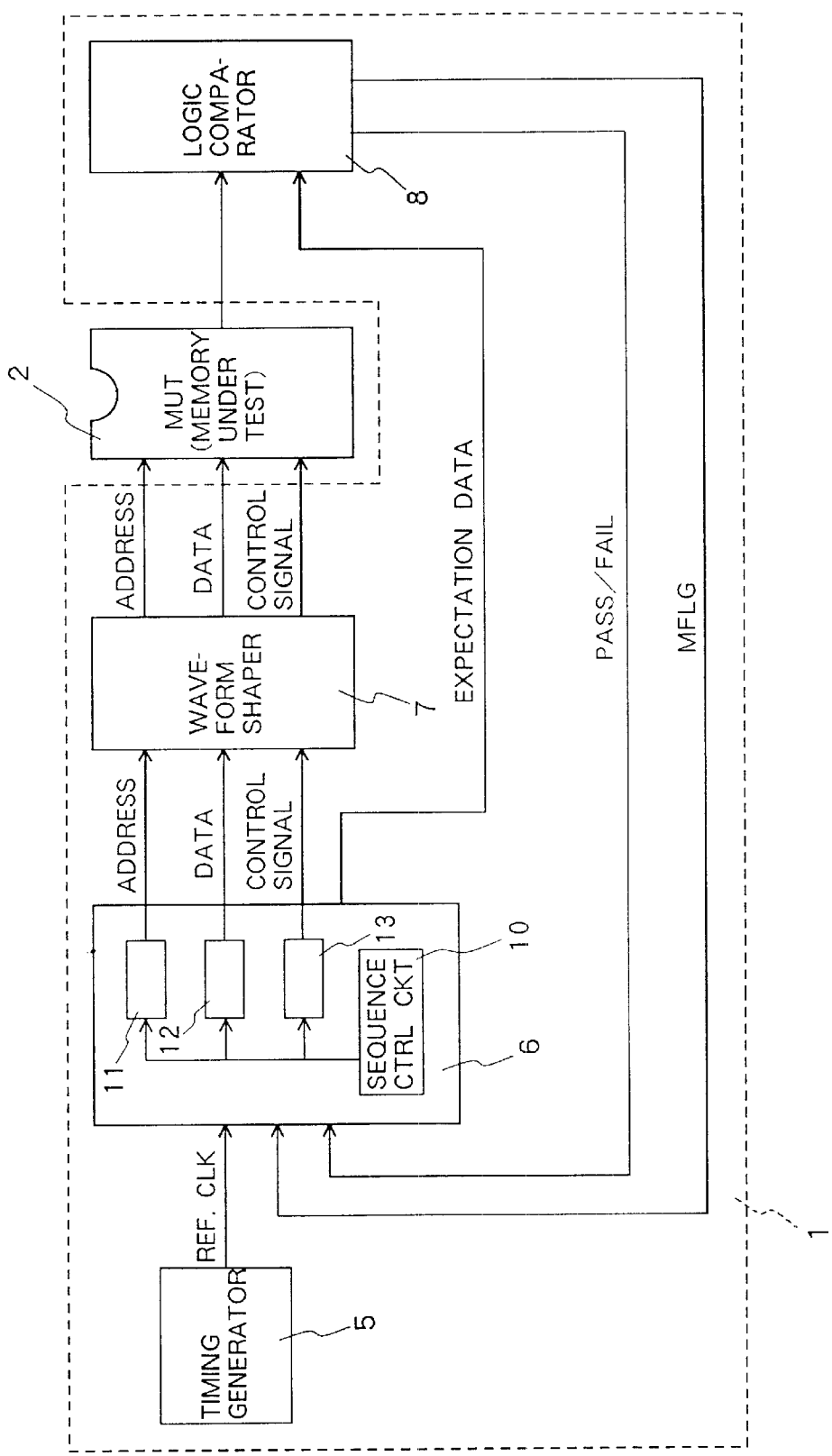
FIG. 1 is a block diagram showing a structure of a memory test apparatus of a common type.
Figure 2:
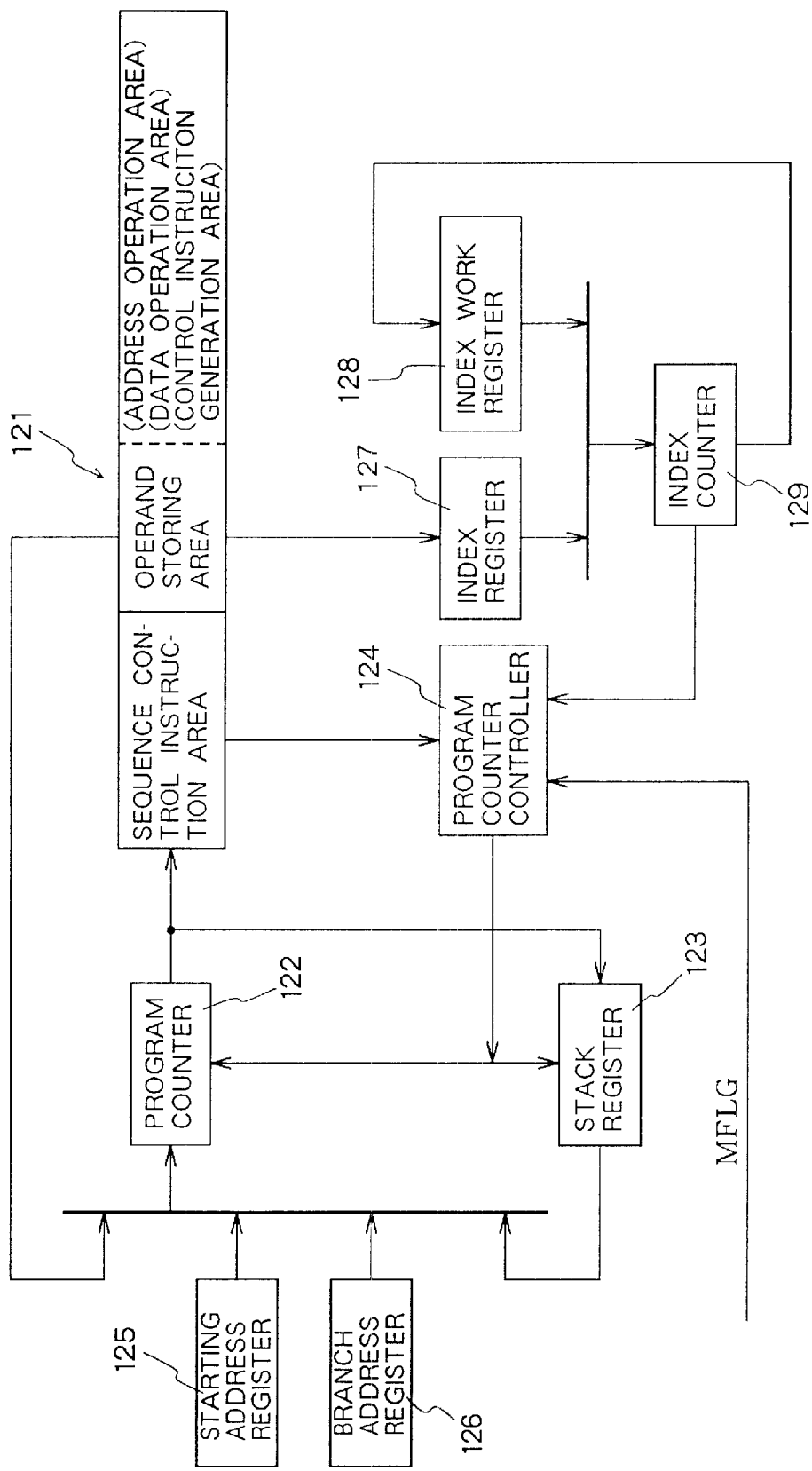
FIG. 2 is a block diagram showing a structure of a conventional sequence control circuit.
Figure 3:
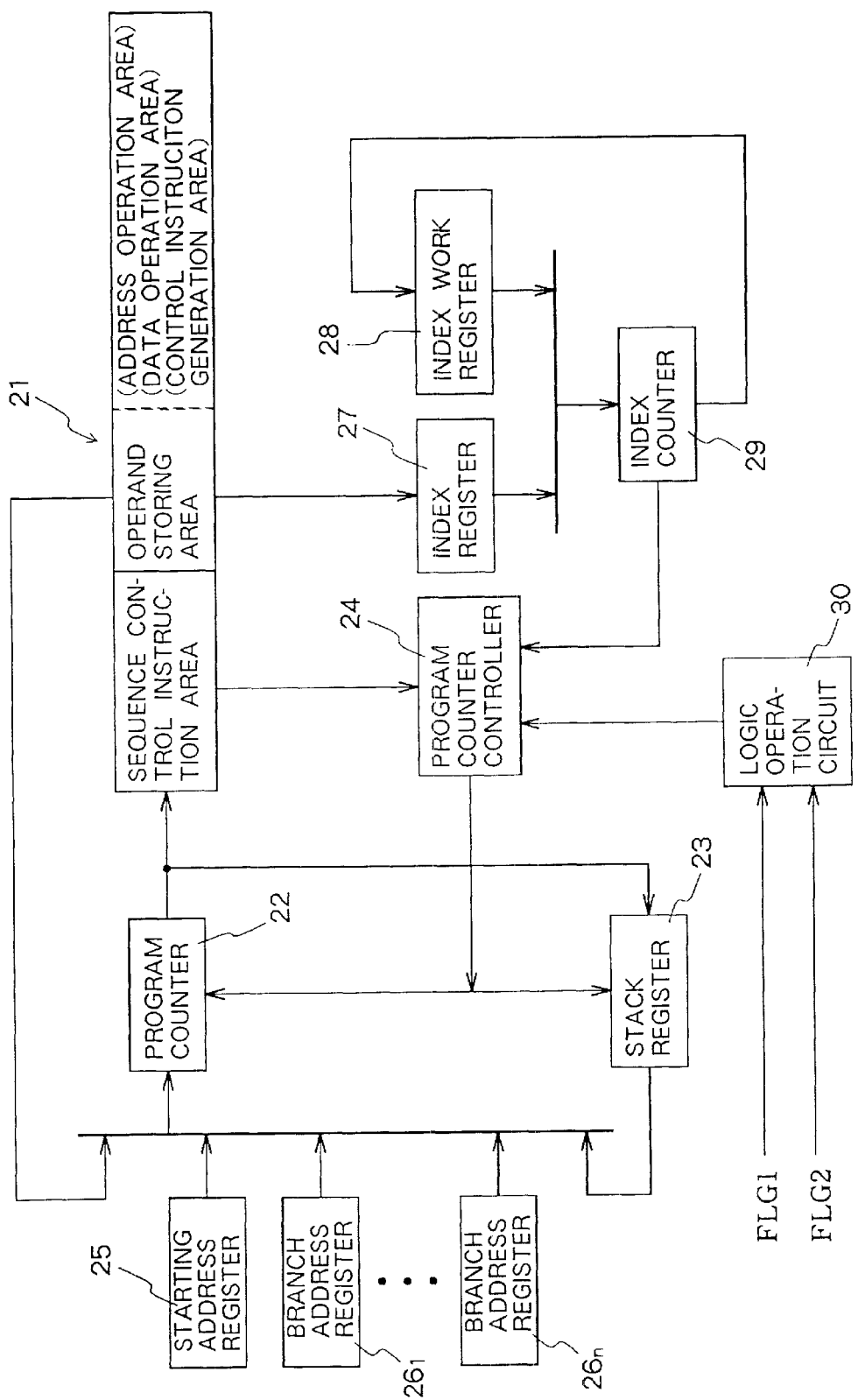
FIG. 3 is a block diagram showing a structure of a sequence control circuit of a preferable embodiment of the present invention.

A sequence control circuit shown in FIG. 3 is used, in the same manner as a conventional sequence control circuit shown in FIG. 2, as the sequence control circuit 10 provided in the test pattern generator 6 of memory test apparatus 1 as shown in FIG. 1. However, the memory test apparatus in this embodiment is different from that of FIG. 1, in that a plurality of flags are inputted in the test pattern generator 6 from the logic comparator 8.

The sequence control circuit of the present embodiment shown in FIG. 3 comprises: an instruction memory 21 for storing a test program consisting of a series of instructions for generating a test pattern; a program counter (PC) 22 for designating an address of instruction memory 21; a stack register 23 for temporary saving of addresses; a program counter controller 24 for controlling the program counter 22 and the stack register 23; a starting address register (STA) 25 for storing an initial value of the program counter 22; a plurality of branch address registers (BARs) $26_1$ to $26_n$ each for storing the address of the branch designated by branch instructions; an index register 27; an index work register 28; an index counter 29 and a logic operation circuit 30. The logic operation circuit 30 receives a plurality of flags (two flags FLG1, FLG2 are shown in the example illustrated) for decoding these plurality of flags. A branch address can be set to each of the branch address registers $26_1$ to $26_n$, independently.

The instruction memory 21 has a same structure and same function as those of the instruction memory 121 in the conventional sequence control circuit shown in FIG. 2 and has a pair of sequence control instruction areas for storing an operation code part and an operand storing area for storing an operand.

The program counter controller 24 receives an operation code part of sequence control instructions from the instruction memory 21, an output from the logic operation circuit 30 and an output of the index counter 29. The program counter controller 24 controls the program counter 22 and the stack register 23 based on the result obtained by decoding the instructions stored in instruction memory 21 and based on the outputs from the logic operation circuit 30 and the index counter 29. In the concrete, the program counter controller 24 handles a content of the program counter 22, that is, the value showing an address to be read next in the instruction memory 21, through the increment, decrement or hold operation and loads the value into the program counter 22. For loading the above value to program counter 22, the program counter controller 24 arranges according to the instructions read out so that any one of (i) an operand of the instruction for a present address of the instruction memory 21, (ii) a content of the starting address register 25, (iii) contents of the branch address registers $26_1$ to $26_n$, and (iv) a content of the stack register 23 is set to the program counter 22 as the value.

An address read from the operand storing area of the instruction memory 21 is also supplied to the index register 27. The index counter 29 controls loop instructions by using this index register, 27 and the index work register 28 which serves as a work register, and when the counter value coincides with a specific value, outputs the value to the program counter controller 24 thereby controlling the program counter 22.

As a result, when compared with the conventional sequence control circuit shown in FIG. 2, the sequence control circuit shown in FIG. 3 according, to the present invention has a plurality of branch address registers $26_1$ to $26_n$ and the logic operation circuit 30 for decoding a plurality of inputted flags. Accordingly the sequence control circuit shown in FIG. 3 differs from that shown in FIG. 2 in that output data of the logic operation circuit 30 are input, instead of flags, directly to the program counter controller 24.

In this sequence control circuit, a plurality of branch address registers $26_1$ to $26_n$ are provided and combinations of respective values of a plurality of flags are detected by the logic operation circuit 30. It is arranged such that an address stored in a certain branch address register is to be loaded to the program counter 22 according to the detected combination of the flag values. Of course, in some case according to a type of detected combination, an address in the branch address register is not loaded, but instead, increment or decrement operation is performed with reference to the current value of the program counter 22. In other words, in this sequence control circuit, it is arranged such that an address to be loaded to the program counter 22 can be selected from a plurality of branch addresses by using a plurality of flags.

Now, the present embodiment will be described in more detail by comparing the operation of the conventional sequence control circuit shown in FIG. 2, into which only one flag is inputted, with the operation of the present embodiment.

In case of the conventional sequence control circuit shown in FIG. 2, at most one branch address corresponds to the content of one flag FLG1 (here, a match flag MFLG corresponds to flag FLG1). In this case, the process in which the flag is detected and a program counter value changes correspondingly is shown as follows. Here, "(FLG1)" represents the value of flag FG1, "PC" represents a program counter, "(PC)" shows the present value of the program counter, "m" shows a branch address stored in the branch address register, "→" represents load, that is, the value to the left of this mark is stored in an item on the right side of this mark.

$$\text{If (FLG1)=0, then } m \rightarrow PC \qquad (1)$$

$$\text{If (FLG1)=1, then } (PC)+1 \rightarrow PC \qquad (2)$$

Equation (1) shows that if flag FLG1 value is "1", then an branch address is loaded to the program counter, that is, a conditional branch takes place, equation (2) shows that a value of a program counter is handled by the increment operation, that is, the program is executed without having any branch. Namely, in this case, it can not finish a loop until the flag value reaches "1". By arranging this flag detection branch instructions and index loop instructions in a combination, it becomes possible to describe a pattern in which, if a write termination flag is not detected after a writing loop of predetermined cycles is completed in a flash memory test, it wall be judged as FAIL.

While, in case of the present embodiment, it is possible to generate, for example, branches as follows corresponding to the combination of values of two flags FLG1, FLG2. "(FLG2)" represents the value of flag FLG2, and marks m, n, k show branch addresses set in the respective different branch address register.

$$\text{If (FLG1)=0 and (FLG2)=0, then } m \rightarrow PC \qquad (3)$$

$$\text{If (FLG1)=1 and (FLG2)=0, then } (PC)+1 \rightarrow PC \qquad (4)$$

$$\text{If (FLG1)=0 and (FLG2)=1, then } n \rightarrow PC \qquad (5)$$

$$\text{If (FLG1)=1 and (FLG2)=1, then } k \rightarrow PC \qquad (6)$$

In this way in case of the present embodiment, with combination of two flags FLG1 and FLG2, there are three kinds of branch addresses (equations (3), (5), (6)) which can be set, while having one case of no branch address (equation (4)), thus realizing designation of a plurality of branch addresses by using a plurality of flags.

By using the sequence control circuit of the present embodiment and by allocating flags, one flag showing execution or termination of automatic algorithm and the other flag showing a time-over, to the above two flags FLG1, FLG2, respectively, it becomes possible to simply describe a test pattern with one statement in the test program, the test pattern which allows to change a branch according to the value of two flags, but so far a complicated description has been required to prepare the test pattern.

The present invention has been described above with an example which uses two flags, however, the case with flags of three or more can be realized in the same way as described above.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A sequence control circuit comprising:

an instruction memory for storing a test program;

a plurality of branch address registers each for storing a branch address;

a logic operation circuit for receiving a plurality of flags from a semiconductor memory device under test and generating at least one combination of the flags;

a program counter for designating an address of the instruction memory; and a program counter controller for controlling the program counter according to a control word read from the instruction memory and for selecting one of the branch address registers in response to a specified value of the combination of flags generated by the logic operation circuit;

wherein a branch address stored in the selected branch address register is loaded into the program counter.

2. The sequence control circuit according to claim 1, further comprising an index register and an index counter for controlling loop instructions.

3. The sequence control circuit according to claim 2, wherein the sequence control circuit is provided in the test pattern generator of the memory test apparatus for performing the test of the semiconductor memory device.

4. The sequence control circuit according to claim 3, wherein the instruction memory comprises a sequence control instruction area for storing an operation code part of sequence control instructions and an operand storing area for storing an operand corresponding to the operation code part, the operation code part stored in said sequence control instruction area is supplied to the program counter controller as the control word, and address information read from the operand storing area is supplied to the index register.

5. The sequence control circuit according to claim 2, wherein the semiconductor memory device is a flash memory.

6. The sequence control circuit according to claim 1, wherein the sequence control circuit is provided in a test pattern generator of a memory test apparatus for performing a test of the semiconductor memory device.

7. The sequence control circuit according to claim 5, wherein the instruction memory comprises a sequence control instruction area for storing an operation code part of sequence control instructions and an operand storing area for storing an operand corresponding to the operation code part, and the operation code part stored in the sequence control instruction area is supplied to the program counter controller as the control word.

8. The sequence control circuit according to claim 1, wherein the semiconductor memory device is a flash memory.

9. The sequence control circuit according to claim 1, wherein the plurality of flags comprises two flags, one of which indicates that an automatic algorithm is executed or terminated, and the other of which indicates that a time limit is over.

10. A sequence control circuit, for generating a test program, in a memory test apparatus that tests a semiconductor memory device, the sequence control circuit comprising:

a plurality of branch address registers, each branch address register storing a branch address associated with a test program; and a combination generation and register selection device for receiving a plurality of flags from a semiconductor memory device under test and generating at least one combination of the flags, and, in response to a specified value of the combination, for selecting one of the branch address registers, wherein a branch address is read out of the selected branch address register so as to designate a test program for the semiconductor memory device.

11. The sequence control circuit according to claim 10, wherein the plurality of flags comprises two flags, one of which indicates that an automatic algorithm is executed or terminated, and the other of which indicates that a time limit is over.

12. The sequence control circuit according to claim 10, wherein the semiconductor memory device is a flash memory.

* * * * *